United States Patent
Kuroiwa (10) Patent No.: US 6,618,156 B2
(45) Date of Patent: Sep. 9, 2003

(54) CELL THICKNESS DETECTION METHOD, CELL THICKNESS CONTROL SYSTEM, AND MANUFACTURING METHOD FOR LIQUID CRYSTAL DEVICE

(75) Inventor: Masahiro Kuroiwa, Nagano (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 09/945,341

(22) Filed: Aug. 30, 2001

(65) Prior Publication Data

US 2002/0044283 A1 Apr. 18, 2002

(30) Foreign Application Priority Data

Sep. 1, 2000 (JP) .......................... 2000-265600

(51) Int. Cl.$^7$ .............................................. G01B 11/06
(52) U.S. Cl. .................. 356/630; 356/369; 356/632; 349/192
(58) Field of Search .............................. 356/369, 630, 356/632; 349/187–192; 250/559.27

(56) References Cited

U.S. PATENT DOCUMENTS

| | | | | |
|---|---|---|---|---|
| 5,450,205 A | * | 9/1995 | Sawin et al. | 356/632 |
| 5,677,749 A | * | 10/1997 | Tsubota et al. | 349/160 |
| 2001/0048528 A1 | * | 12/2001 | Choi | 356/630 |

* cited by examiner

Primary Examiner—Richard A. Rosenberger
Assistant Examiner—Vincent P. Barth
(74) Attorney, Agent, or Firm—Harness, Dickey & Pierce, P.L.C.

(57) ABSTRACT

Light is transmitted through a compressing clamp which clamps the liquid crystal display panel 10, and the spectrum of light is obtained by a spectrometer 141. A cell thickness is detected based on a wavelength or a frequency at which the spectrum has the minimum or maximum value. The obtained cell thickness is compared with a desired value, and a pressure control unit 132 supplies the compressing clamp with a fluid in accordance with the result of the comparison.

13 Claims, 6 Drawing Sheets

(a) RUBBING DIRECTION (b) POLARIZATION TRANSMISSION AXES OF POLARIZERS (c) FUNCTION $F(\lambda)$

CELL THICKNESS DETECTION METHOD, CELL THICKNESS CONTROL SYSTEM, AND MANUFACTURING METHOD FOR LIQUID CRYSTAL DEVICE

BACKGROUND OF THE INVENTION

1. Technical Field of the Invention

The present invention relates to a cell thickness detection method for detecting a cell thickness of a liquid crystal panel, a cell thickness control system, and a manufacturing method for a liquid crystal device.

2. Description of the Related Art

Conventionally, liquid crystal displays include liquid crystal display panels constructed by laminating two substrates with a sealing member therebetween and injecting a liquid crystal into a space surrounded by the sealing member. In such liquid crystal display panels, a gap between the two substrates, which will be referred to as "cell thickness" in the following description, is an important parameter that determines the thickness of a liquid crystal layer. Optical characteristics of the liquid crystal display panels are determined by the cell thicknesses thereof.

Normally, in a manufacturing process of a liquid crystal display device, two substrates are laminated with an uncured sealing member therebetween, and then the laminate is compressed with a predetermined pressure so that the substrates are bonded to each other. In this process, spherical or columnar spacers are mixed in the sealing member or spread over one of the substrates before laminating the other one thereon, so that the cell thickness is limited by the outside size of the spacers. The sealing member is then cured in this state by a heating process, etc., and a cell structure, that is, an empty cell, of the liquid crystal display panel is formed.

The above-described sealing member is provided with an opening which serves as an inlet for a liquid crystal, and the liquid crystal is injected into the above-described empty cell through this inlet. When the liquid crystal is injected, the liquid crystal display panel slightly deforms to swell outwards. Thus, during a sealing process of the liquid crystal in which a sealing material is applied to the inlet for the liquid crystal and is cured by applying ultraviolet rays, etc., the liquid crystal display panel should be compressed and the cell thickness is made uniform. When the liquid crystal is sealed as described above, the shape of the liquid crystal display panel at the sealing process is maintained, and the cell thickness can be made uniform over the entire display region.

Accordingly, the resulting cell thickness and the cell thickness distribution of the liquid crystal display panel are determined by the cell thickness thereof during the sealing process of the liquid crystal. Thus, conventionally, in the sealing process of the liquid crystal, the cell thickness is measured while the liquid crystal display panel is compressed, and the liquid crystal is sealed when the cell thickness becomes a desired value. With respect to measuring methods of the cell thickness, such a method is known in which light is emitted from a light source and interference of reflected light from the substrate surfaces, etc., is used for determining the cell thickness (a method using an optical thickness gauge which utilizes light interference). In addition, another method is also known in which a pair of polarizers are disposed in the front and rear of the liquid crystal display panel, and the hue of light transmitted through the liquid crystal display panel and the polarizers is used for determining the cell thickness.

However, the method in which the cell thickness is determined by utilizing the interference of the reflected light has the following problem. Since multiple layers such as a transparent electrode, an insulating film, an alignment film, a color filter, etc., are included in the liquid crystal display panel, the reflected light, which is generated at interfaces of the layers, causes interference, and the interference thereof becomes complex. In addition, the intensity of the reflected light is considerably small, so that it is difficult to determine the cell thickness with high accuracy.

In addition, there is also a problem in the method in which the cell thickness is determined by obtaining the hue of light transmitted through the liquid crystal display panel and the polarizers disposed in the front and rear of the liquid crystal display panel. When the cell thickness of a color liquid crystal display panel including a color filter is determined, the detected cell thickness is affected by the hue of the color filter. Thus, the detection of the cell thickness may not be possible due to the color filter. In addition, even if the detected value is corrected in consideration of the hue of the color filter, the cell thickness cannot be detected with sufficient accuracy.

Accordingly, an object of the present invention is to provide a new cell thickness detection method which is free from the above-described problems, and with which the cell thickness of a liquid crystal panel is detected with high accuracy without being affected by the existence of a color filter. In addition, it is also an object of the present invention to form a cell structure with high accuracy by using the new cell thickness detection method to provide a high quality liquid crystal device.

SUMMARY OF THE INVENTION

According to the present invention, a cell thickness detection method for detecting a cell thickness of a liquid crystal panel which is constructed by laminating two substrates and disposing a liquid crystal layer between the substrates includes the steps of setting a light path for transmitting light through a first polarizing means, the liquid crystal layer, and a second polarizing means, in that order; obtaining a spectrum of light which is transmitted along the light path; deriving a detection value which is a wavelength, a frequency, or other value related to the wavelength or the frequency at which the spectrum has a minimum or maximum value; and determining the cell thickness based on the detection value.

Accordingly, the spectrum of light which is transmitted through the first polarizing means, the liquid crystal layer, and the second polarizing means, in that order, is obtained. This spectrum includes the minimum or maximum value at a wavelength or frequency position that is determined by a relative angle $\phi$ between the polarization transmission axes of the first and second polarizing means, an optical anisotropy $\Delta n$ and a twist angle $\theta$ of the liquid crystal, and the cell thickness d. When the relative angle $\phi$ is set to a predetermined value, the wavelength or the frequency, at which the spectrum has the minimum or maximum value, vary with the cell thickness d without being affected by the hue generated by a color filter included in the liquid crystal panel, etc. Accordingly, by obtaining the wavelength, the frequency, or other value related to the wavelength or the frequency as the detection value, the cell thickness d can be determined with high accuracy without being affected by the interference of reflected light, the color tone of the color filter, etc.

Preferably, the wavelength or the frequency, at which the spectrum has the minimum or maximum value, is in the visible light region. When the detection value is in the visible light region, the measurement becomes easier, and the cell thickness d can be detected with higher accuracy.

In addition, preferably, a light source of light which is transmitted along the light path has an emission spectrum which is continuous in at least a wavelength region corresponding to the detection value. When a light source having an emission spectrum which is continuous at a wavelength region corresponding to the detection value is used, the influence of the emission spectrum on the detection value can be reduced, and the cell thickness can be detected with higher accuracy. Halogen lamps are an example of such a light source that has an emission spectrum which is continuous in the visible light region, and fluorescent tubes are an example of such a light source that has an emission spectrum which is not continuous in the visible light region.

According to another aspect of the present invention, a cell thickness control system for controlling a cell thickness of a liquid crystal panel which is constructed by laminating two substrates and disposing a liquid crystal layer between the substrates includes a compressing means for applying a controlled pressure to the liquid crystal panel; an optical detection system including a light path for transmitting light through a first polarizing means, the liquid crystal layer, and a second polarizing means, in that order; a spectrum obtaining unit for obtaining a spectrum of light which is emitted from the optical detection system; a detection value deriving means for deriving a detection value which is a wavelength, a frequency, or other value related to the wavelength or the frequency at which the spectrum has a minimum or maximum value; and a controlling means for controlling the pressure of the compressing means so that the detection value becomes closer to a value corresponding to a desired value of the cell thickness.

Preferably, the controlling means controls the pressure of the compressing means based on a predetermined relationship between the pressure applied on the liquid crystal panel and the change in the detection value or of the cell thickness corresponding to the detection value. Accordingly, the cell thickness can be controlled with higher accuracy in a shorter time. In this case, the relationship between the pressure and the change in the detection value or of the cell thickness corresponding to the detection value around the desired value of the cell thickness is preferably used.

In addition, preferably, the compressing means includes a pair of clamping members, at least one of which is transparent, and which oppose each other with the liquid crystal panel therebetween, a sealing means for sealing gaps between the clamping members and the liquid crystal panel, and a fluid supplying means for supplying a fluid to the gaps between the clamping members and the liquid crystal panel with the controlled pressure. By disposing the liquid crystal panel between the clamping members and applying the pressure on the liquid crystal panel via the fluid supplied to the gaps between the clamping members and the liquid crystal panel, the liquid crystal panel can be uniformly and flexibly compressed. Thus, the cell thickness can be controlled with higher accuracy and adjustments can be performed more precisely, so that the time required for controlling the cell thickness can be reduced compared with the conventional methods.

In addition, according to another aspect of the present invention, a manufacturing method for a liquid crystal device including a liquid crystal panel which is constructed by laminating two substrates and disposing a liquid crystal layer between the substrates includes the steps of setting a light path for transmitting light through a first polarizing means, the liquid crystal layer, and a second polarizing means, in that order; obtaining a spectrum of light which is transmitted along the light path; deriving a detection value which is a wavelength, a frequency, or other value related to the wavelength or the frequency at which the spectrum has the minimum or maximum value; and compressing the liquid crystal panel in accordance with the detection value and making adjustments so that the detection value becomes almost the same as a value corresponding to a desired value of the cell thickness.

Preferably, a liquid crystal is first injected into the liquid crystal panel, and is then sealed in such a state that the liquid crystal panel is compressed in accordance with the detection value and adjustments are made so that the detection value becomes almost the same as the value corresponding to the desired value of the cell thickness.

In addition, according to another aspect of the present invention, a cell thickness detection method for detecting a cell thickness of a liquid crystal panel which is constructed by disposing two substrates in such a manner that the substrates oppose each other and disposing a liquid crystal layer between the substrates includes the steps of setting a light path for transmitting light through a first polarizing means, the liquid crystal layer, and a second polarizing means, in that order; obtaining a spectrum of light which is transmitted along the light path; deriving a detection value which is a wavelength or a frequency at which the spectrum has the minimum or maximum value; and determining the cell thickness based on the detection value.

In addition, according to another aspect of the present invention, a cell thickness detection method for detecting a cell thickness of a liquid crystal panel which is constructed by disposing two substrates in such a manner that the substrates oppose each other and disposing a liquid crystal layer between the substrates includes the steps of setting a light path for transmitting light through a first polarizing means, the liquid crystal layer, and a second polarizing means, in that order; obtaining a spectrum of light which is transmitted along the light path; deriving a detection value which is a value corresponding to a wavelength or a frequency at which the spectrum has the minimum or maximum value; and determining the cell thickness based on the detection value.

BRIEF DESCRIPTION OF THE DRAWINGS

FIG. 6(*a*) is an explanatory drawing showing rubbing directions of a liquid crystal panel which is used for obtaining a function F according to the embodiment, FIG. 6(b) is an explanatory drawing showing directions of polarization transmission axes of polarization plates disposed in the front and rear of the liquid crystal panel, and FIG. 6(c) is a graph showing the relationship between the wavelength $\lambda_b$ and the cell thickness d according to the function F.

DETAILED DESCRIPTION OF THE PREFERRED EMBODIMENTS

With reference to the accompanying drawings, a cell thickness detection method, a cell thickness control system, and a manufacturing method for a liquid crystal device according to the present invention will be described below in conjunction with an embodiment thereof.

Figure 1:
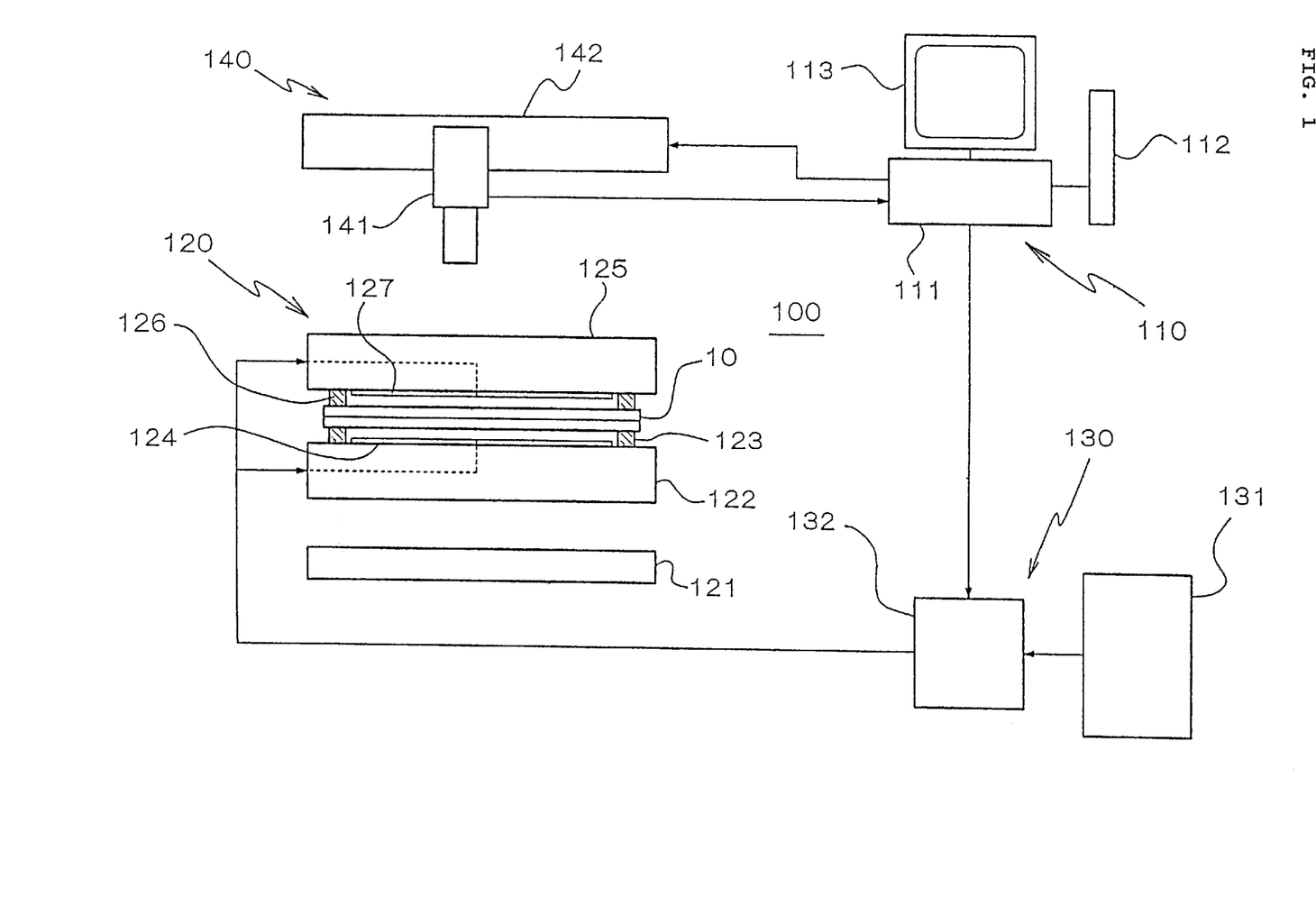
FIG. 1 is a schematic diagram showing an overall construction of a cell thickness control system according to an embodiment of the present invention.

FIG. 1 is a schematic diagram showing an overall construction of a cell thickness control system 100 incorporating a cell thickness detection method according to the present invention. The cell thickness control system 100 includes a control apparatus 110, which is provided with a microprocessor unit (MPU) such as a personal computer, etc., a compressing clamp 120 for compressing a liquid crystal display panel 10, a fluid supply apparatus 130 for supplying the compressing clamp 120 with a compressed fluid such as compressed air, etc., and a spectrometer apparatus 140 for obtaining a spectrum of light emitted from the liquid crystal display panel 10 which is clamped by the compressing clamp 120.

The liquid crystal display panel 10 is constructed by injecting a liquid crystal having twisted orientation (for example, a nematic liquid crystal) between two panel substrates which are laminated with a sealing member therebetween. In the present embodiment, the liquid crystal display panel 10, which is the controlled object, has a panel structure of the transmissive type.

The control apparatus 110 includes a control unit 111, which is the main body of the control apparatus 110, an input device 112 such as a keyboard, etc., which is connected to the control unit 111, and an output device 113 such as a display, etc., which is also connected to the control unit 111. The control unit 111 includes the above-described MPU which contains a central processing unit (CPU), a memory, signal lines, etc., and an input/output circuit which transmits signals between the MPU and the exterior apparatuses. The control unit 111 transmits control signals to the compressing clamp 120, the fluid supply apparatus 130, and the spectrometer apparatus 140 via the input/output circuit to control each of the apparatuses. In addition, the control unit 111 receives spectral data, which represent the spectrum and other spectral parameters obtained by the spectrometer apparatus 140, at the input/output circuit and stores them.

The compressing clamp 120 includes a backlight 121 which is constructed of a surface light source such as an electroluminescent panel or by combining a point light source or a line light source such as a halogen lamp, an LED, and a cold-cathode tube, with a light guide plate. In the present embodiment, in order to reduce the influence on a wavelength or a frequency at which the spectrum has the minimum or maximum value, which will be described below, a light source having an emission spectrum which is continuous in at least a wavelength region including the minimum or maximum value is preferably used. For example, when the visible light region is considered, a light source having a smooth emission spectrum such as a halogen lamp is more preferable than a light source having an emission spectrum including a high peak such as a fluorescent tube.

In addition, a first substrate 122 and a second substrate 125, which are transparent and are constructed of a glass, an acrylic resin, etc., are disposed above the backlight 121. The liquid crystal display panel 10 is sandwiched between the first substrate 122 and the second substrate 125 via sealing members 123 and 126, which are elastic and are formed to have a closed shape. The space between the first substrate 122 and the liquid crystal display panel 10 is sealed by the sealing member 123, and the space between the second substrate 125 and the liquid crystal display panel 10 is sealed by the sealing member 126. A polarizer 124 is disposed on the inside surface of the first substrate 122 in such a manner that the polarization transmission axis thereof is rotatable around the optical axis (vertical axis in the figure). In addition, a polarizer 127 is disposed on the inside surface of the second substrate 125 in such a manner that the polarization transmission axis thereof is rotatable around the optical axis. When the first substrate 122 and the second substrate 125 are constructed of a material which is not optically anisotropic such as a glass, etc., the polarizers 124 and 127 may also be disposed on the outside surfaces of the first substrate 122 and the second substrate 125 or outside the first substrate 122 and the second substrate 125.

Fluid supply passes (not shown), which are connected to the fluid supply apparatus 130 and lead to the above-described spaces, are individually formed inside the first substrate 122 and the second substrate 125. The fluid supply apparatus 130 includes a fluid source 131 which is constructed of a compressor, a gas cylinder, etc., and a pressure control unit 132 which is connected to the fluid source 131. The pressure control unit 132 stops and restarts the supply of a fluid from the fluid source 131 to the first substrate 122 and the second substrate 125, and controls the pressure of the fluid supplied to the first substrate 122 and the second substrate 125.

The spectrometer apparatus 140 includes a spectrometer 141 and a moving mechanism 142 for moving the spectrometer 141 relative to the compressing clamp 120. The spectrometer 141 is used for obtaining at least a spectrum in the visible light region or detection data corresponding thereto of light emitted from the compressing clamp 120. The spectrometer 141 may be, for example, a spectrometer using spectroscopic elements, a spectrometer utilizing multiplex spectroscopy, a multi-channel spectrometer, etc. The moving mechanism 142 is preferably constructed such that the entire display region of the liquid crystal display panel 10 can be covered by scanning the spectrometer 141 when the measuring region of the spectrometer 141 is limited relative to the display region.

The spectrometer apparatus 140 may also be constructed such that the measuring region thereof covers the entire part or a major part of the display region of the liquid crystal display panel 10 so that the moving mechanism 142 is not necessary.

In the cell thickness control system 100, the liquid crystal display panel 10 is sandwiched between the first substrate 122 and the second substrate 125. Thus, the illuminated light of the backlight 121 is transmitted through the first substrate 122, the polarizer 124, the liquid crystal display panel 10, the polarizer 127, and the second substrate 125, and then reaches the spectrometer 141.

In the spectrometer 141, the spectrum of light which is transmitted along the above-described light path or various optical parameters (complex permittivity, etc.) equivalent to the spectrum, that is, parameters from which the spectrum can be obtained by a certain mathematical calculation, are detected.

Figure 3:
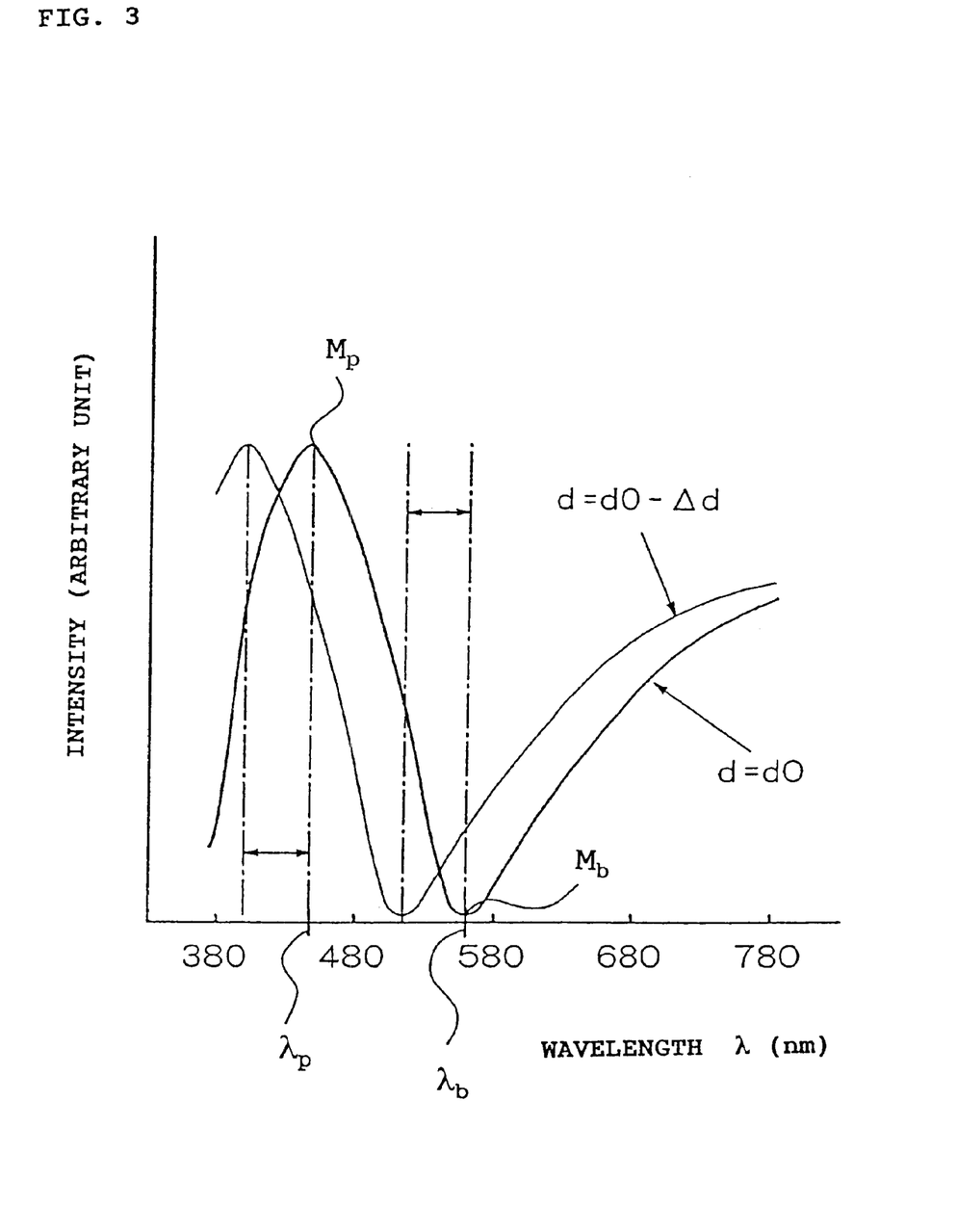
FIG. 3 is a graph showing spectra which are obtained by a spectrometer used in the embodiment.

An example of the above-described spectrum is shown in FIG. 3. As shown in the figure, the spectrum includes the minimum value $M_b$ and the maximum value $M_p$ in the visible light region. The wavelength $\lambda_b$ at which the minimum value $M_b$ is obtained and the wavelength $\lambda_p$ at which the maximum value $M_p$ is obtained have a certain relationship with a cell thickness d of the liquid crystal display panel 10.

Generally, the above-described spectrum can be obtained by the Jones vector method, the 4×4 matrix method, etc., based on optical characteristics of the liquid crystal, i.e., an optical anisotropy $\Delta n$ a twist angle $\theta$, the cell thickness d, an angle $\phi$ between the polarization transmission axes of the polarizers 124 and 127 around the optical axis, the emission spectrum of the light source, and the optical characteristics of the first substrate 122 and the second substrate 125. In addition, the positions of the minimum value $M_b$ and the maximum value $M_p$ in the spectrum, that is, the wavelengths $\lambda_b$ and $\lambda_p$, can be expressed by the above-described parameters. Accordingly, when the conditions of the light source and the compressing clamp 120 are constant and $\Delta n$, $\theta$, and $\phi$ are determined, the cell thickness d can be expressed as a function of the wavelength $\lambda_b$ or $\lambda_p$, $F(\lambda)$. In practice, the cell thickness $d=F(\lambda)$ can be expressed as a function of the wavelength $\lambda_b$ or $\lambda_p$ of the first to fourth degree.

In FIG. 3, two spectra, which are obtained when the cell thickness d is changed (d=d0, d=d0−Δd), are shown. Normally, when the cell thickness d is increased, the above-described wavelengths $\lambda_b$ and $\lambda_p$ in the visible light region are gradually increased in accordance with the above-described function $F(\lambda)$. The function $F(\lambda)$ may be an empirical equation which is obtained by performing multiple experiments.

Figure 6:
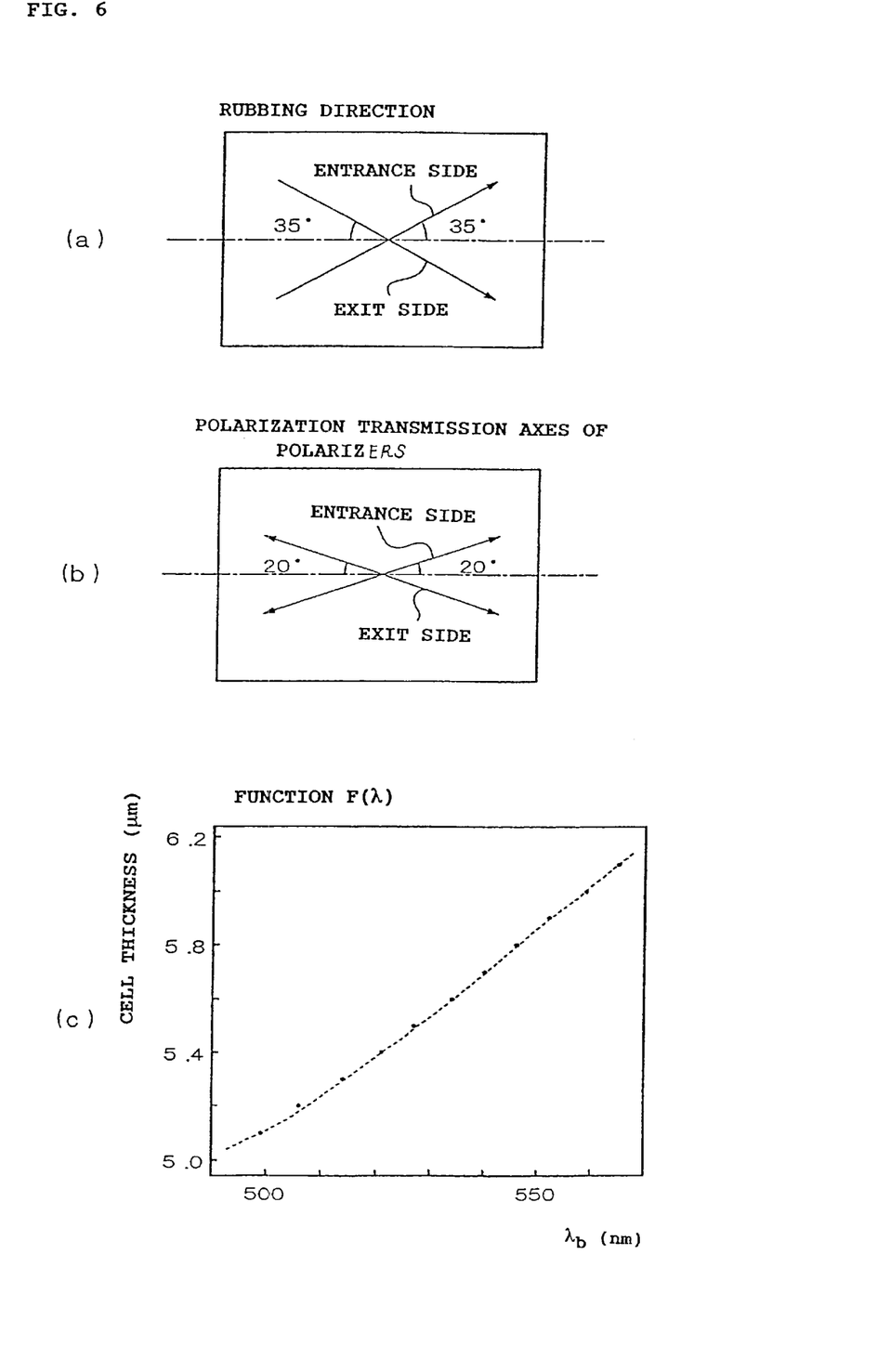

An example of the above-described function $F(\lambda)$ will be described below with reference to FIGS. 6(a) to 6(c). An STN liquid crystal panel including a liquid crystal of which the optical anisotropy is $\Delta n=0.141$ is prepared, and alignment films are formed on substrates disposed at the entrance side (the side at which light is incident) and the exit side. The alignment films are subjected to a rubbing process and are rubbed in directions shown in FIG. 6(a), and the twist angle $\theta$ of the liquid crystal is set to $\theta=250°$. FIG. 6(a) shows the rubbing directions as seen from the exit side of the liquid crystal panel. In addition, polarization transmission axes of polarization plates disposed at the entrance side and the exit side of the liquid crystal panel are set in directions shown in FIG. 6(b). FIG. 6(b) shows the directions of the polarization transmission axes as seen from the exit side of the liquid crystal panel. The desired value of the cell thickness is set to $d0=5.6 \mu m$, and the minimum wavelength $\lambda_b$ (nm), at which the spectrum has the minimum value, is calculated when the cell thickness d is changed in the range of 5.1 to 6.1 $\mu m$. Accordingly, the above-described function F is obtained as follows:

$$d=F(\lambda_b)=-9\times10^{-7}\lambda_b^3+0.0014\lambda_b^2-0.7653\lambda_b+138.29$$

The relationship between the wavelength $\lambda_b$ and the cell thickness d according to the obtained function F is shown in FIG. 6(c).

Figure 4:
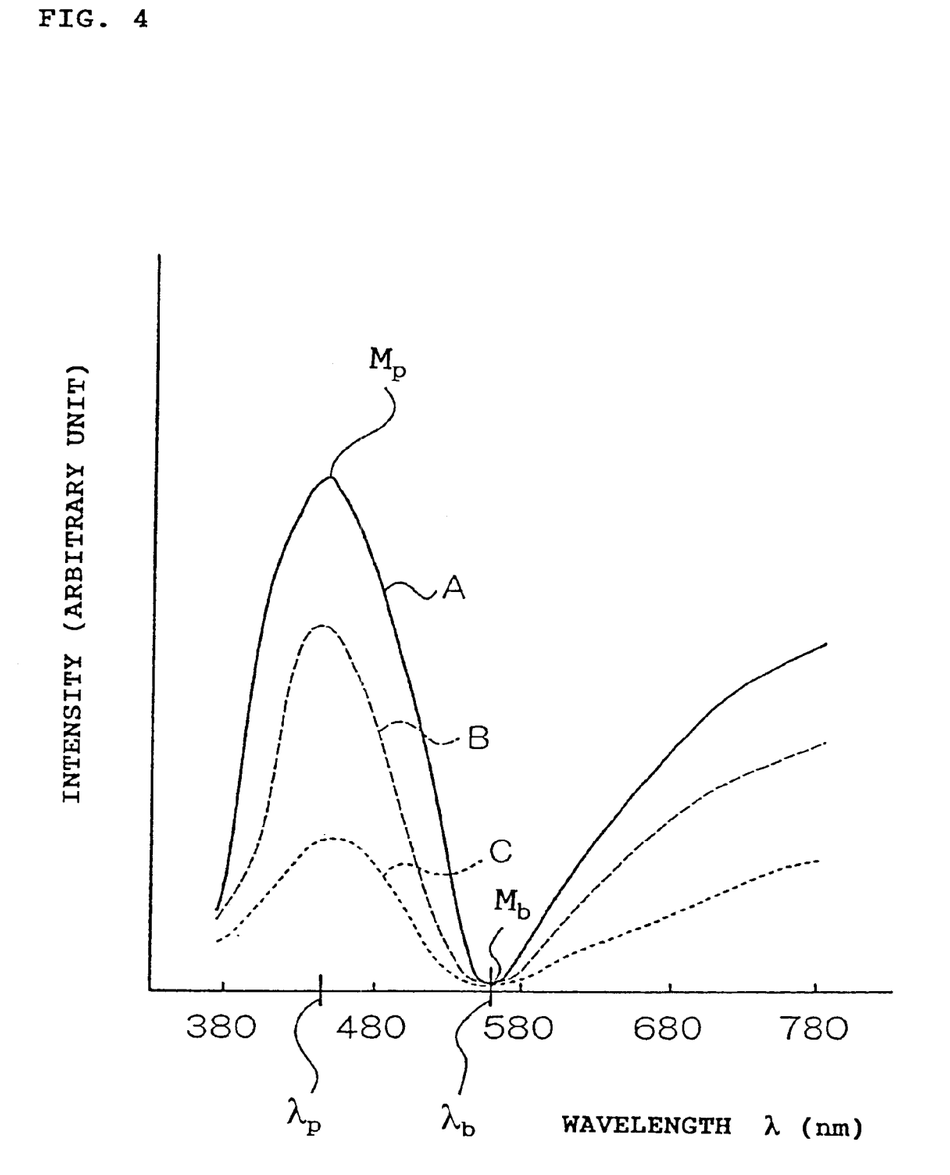
FIG. 4 is a graph showing spectra which are individually obtained by the spectrometer when a monochrome panel (A) which is not provided with a color filter, a color panel (B) which is provided with a color filter, and a color panel (C) which is provided with another color filter are used.

FIG. 4 shows the spectra which are obtained when a monochrome panel A, which is not provided with a color filter, and color panels B and C, each of which is provided with a color filter, are used as the liquid crystal display panel 10. The color filter of the color panel B has a different type of color layer compared with the color filter of the color panel C. In this case, the spectra of light are obtained at parts including a plurality of pixels in the display region.

As shown in FIG. 4, although the spectra considerably differ in accordance with the existence of the color filters, kinds of the color filters, etc., the positions of the above-described minimum value $M_b$ and the maximum value $M_p$ do not practically change and the wavelengths $\lambda_b$ and $\lambda_p$ are practically constant. Thus, when the above-described function $F(\lambda)$ is used for determining the cell thickness d, the detected value is not affected by the existence of a color filter or by the color tone thereof.

In the cell thickness control system 100, the liquid crystal is first injected into the liquid crystal display panel 10. Then, in a process of sealing the inlet for the liquid crystal by a sealing material, the cell thickness is measured while the liquid crystal display panel 10 is compressed by the compressing clamp 120. When the cell thickness becomes a desired value by controlling the compressing force, the sealing material is applied and cured. Since the cell thickness is controlled in the sealing process of the liquid crystal, a liquid crystal display panel 10 having a uniform cell thickness distribution can be obtained with high accuracy. In a case in which a large panel including multiple liquid crystal display panels is formed, the large panel is first broken into rectangular-shaped panels (first breakage) and the liquid crystal is injected into each of the liquid crystal cells in the rectangular-shaped panels. Then, the rectangular-shaped panels are individually set in the compressing clamp 120, and the sealing process is performed while the cell thickness is measured.

Figure 2:
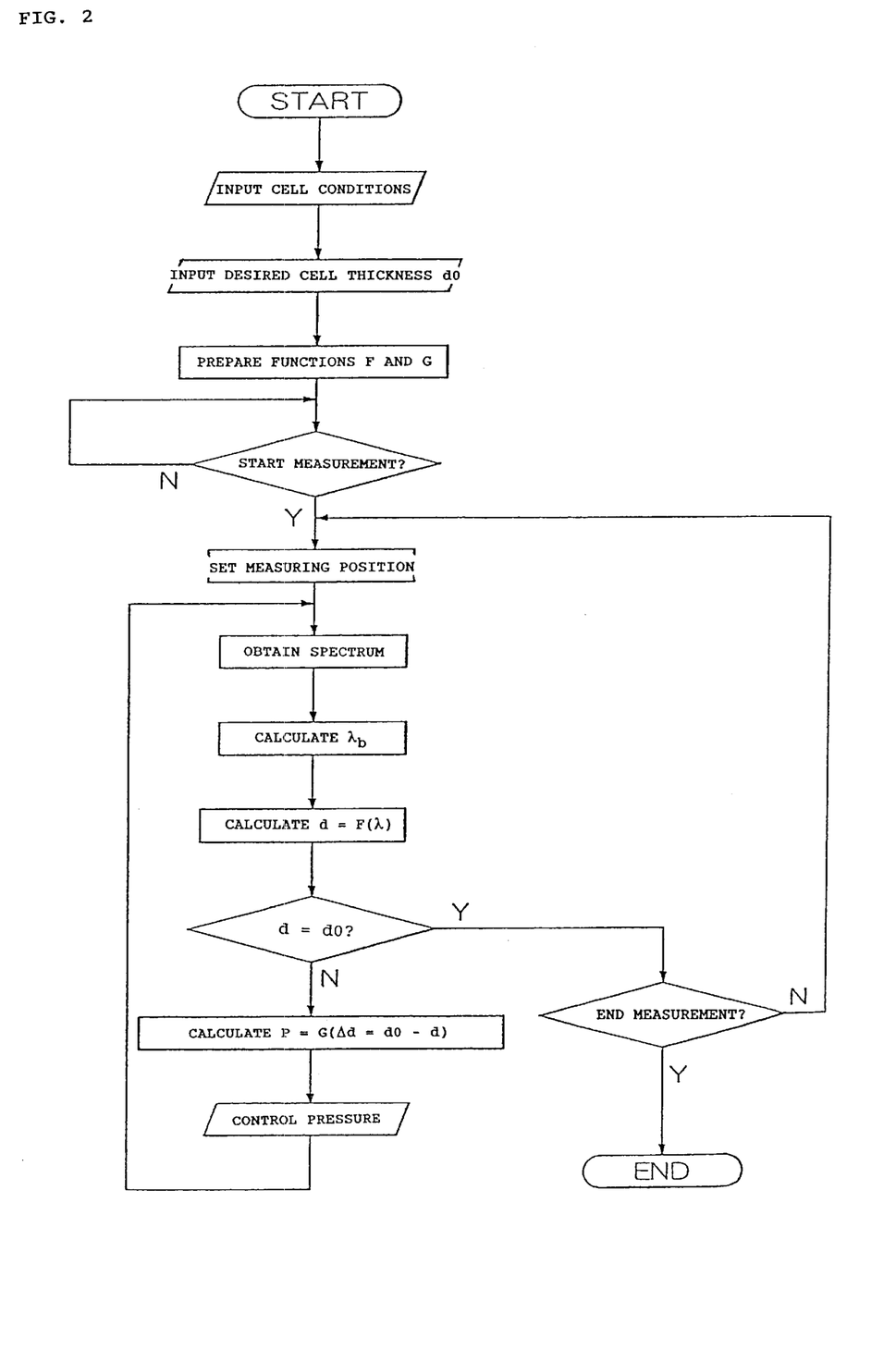
FIG. 2 is a schematic flowchart showing steps of an operation program used in the embodiment.

FIG. 2 is a flowchart of an operation program for operating the cell thickness control system 100. First, the liquid crystal display panel 10 is disposed in the compressing clamp 120, and input data, which are input by the input device 112, are received and stored. The input data includes cell conditions, that is, the optical anisotropy $\Delta n$, the twist angle $\theta$, the angle $\phi$ between the polarization transmission axes of the polarizers 124 and 127, and the thickness, the material, and the optical characteristics of the panel substrates. In addition, the desired value of the cell thickness d0 is also received and stored.

The control unit 111 calculates the above-described function $F(\lambda)$ based on the cell conditions and the desired value. The function $F(\lambda)$ shows the relationship between the cell thickness d and the above-described wavelength $\lambda_b$ or $\lambda_p$. In the present embodiment, the wavelength $\lambda_b$, which corresponds to the minimum value $M_b$ of the spectrum, is used.

In addition, a function $G(\Delta d)=P$, which shows the relationship between the compression force P of the compressing clamp 120 and the cell thickness d, is also calculated along with the function $F(\lambda)$. The function $G(\Delta d)$ shows the relationship between the compression force P, which is the pressure of the fluid supplied to the compressing clamp 120 from the pressure control unit 132, and the change Δd of the cell thickness d which varies around the desired value d0 in accordance with the compression force P. Since the function $G(\Delta d)$ is determined based on parameters which are theoretically or experimentally obtained, the function $G(\Delta d)$ may be set merely as a variable. However, the function $G(\Delta d)$ is preferably corrected for each of the liquid crystal display panels (or cells) by using the above-described parameters and the correction parameters such as the thickness, the materials, etc., of the panel substrates.

When the preparation as described above is completed, the system waits for a start command to be input to the input device 112. When the start command is input, the spectrometer 141 is moved to a suitable position, and the measurement of the spectrum is started. Then, the spectrometer 141 transmits the spectral data to the control unit 111, and the control unit 111 determines the wavelength $\lambda_b$ base on the spectral data.

Then, the cell thickness d is calculated from the wavelength $\lambda_b$ by using the function $F(\lambda)$, and the calculated cell thickness d is compared with the desired value d0. When the cell thickness d is different from the desired value d0, the compressing force $P=G(\Delta d)$, which corresponds to $\Delta d=|d-d0|$, that is, the absolute value of the difference between d and d0 is determined. Then, the control unit 111 transmits a control signal for applying the determined compressing force P to the pressure control unit 132, and compression control of the liquid crystal display panel 10 is performed by the compressing clamp 120.

Then, again, the above-described measurement of the spectrum is performed, and the cell thickness d is calculated and compared with the desired value d0. This process of measuring and comparing is repeated until the cell thickness d becomes the same as the desired value d0, and then the inlet for the liquid crystal formed in the liquid crystal display panel 10 is sealed by a sealing material.

Then, in a case in which a plurality of panel regions included in a rectangular panel are individually measured in accordance with a predetermined measuring pattern, the moving mechanism 142 moves the spectrometer 141, and the above-described measurement is performed for another panel region and the cell thickness thereof is controlled.

According to the above-described cell thickness detection method, the cell thickness control system, and the manufacturing method for a liquid crystal device of the present embodiment, the cell thickness of a liquid crystal display panel can be detected with high accuracy, without practically being affected by the existence of a color filter or by the hue thereof.

Although the wavelength $\lambda_b$ of the spectrum is used for determining the cell thickness d in the above-described embodiment, the wavelength $\lambda_p$ may also be used. In addition, frequencies corresponding to the wavelengths $\lambda_b$ and $\lambda_p$, or other values related to the wavelengths or the frequencies may also be used for determining the cell thickness d.

In addition, in the above-described embodiment, the cell thickness d is calculated from a detection value which is a wavelength, a frequency, or other value related to the wavelength or the frequency, and is compared with the desired value d0. However, the present invention is not limited to this. The cell thickness d may not be calculated, and the detection value may directly be compared with a desired detection value which corresponds to the desired value d0 of the cell thickness d.

Figure 5:
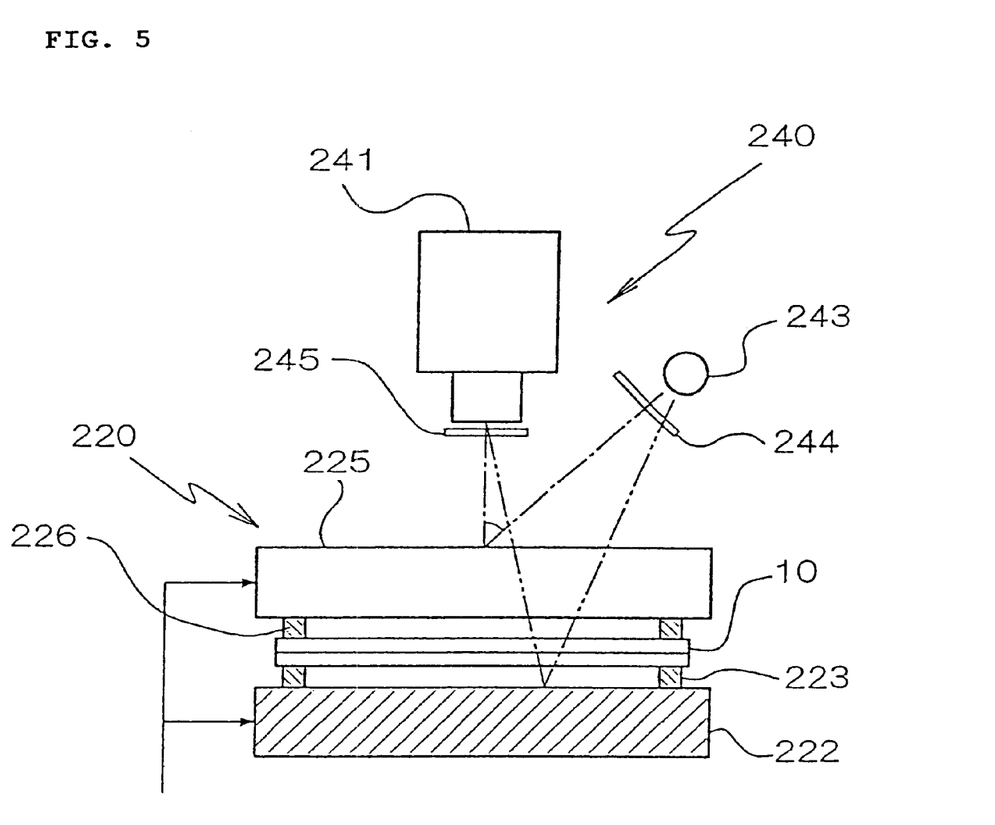
FIG. 5 is a schematic diagram showing a reflective type detection system constructed with a compressing clamp and a spectrometer apparatus which can be used in place of a compressing clamp and a spectrometer apparatus used in the embodiment.

FIG. 5 is a schematic diagram which shows a schematic construction of a compressing clamp 220 and a spectrometer apparatus 240 which can be used in place of the compressing clamp 120 and the spectrometer apparatus 140, respectively, which are used in the above-described embodiment.

The compressing clamp 220 includes a first substrate 222, a sealing member 223, a second substrate 225 which is transparent, and a sealing member 226. The liquid crystal display panel 10 is sandwiched by the first substrate 222 and the second substrate 225. Similar to the above-described embodiment, the space between the first substrate 222 and the liquid crystal display panel 10 and the space between the second substrate 225 and the liquid crystal display panel 10 are sealed by the sealing members 223 and 226, respectively. In addition, the liquid crystal display panel 10 can be compressed by the above-described fluid supply apparatus 130. In the compressing clamp 220, a surface (upper surface) of the first substrate 222 is reflective.

The spectrometer apparatus 240 includes a spectrometer 241 which is similar to the above-described spectrometer 141, a light source 243 which emits light toward the compressing clamp 220 at an angle from above, a polarizer 244 which is disposed between the light source 243 and the compressing clamp 220, and another polarizer 245 which is disposed between the compressing clamp 220 and the spectrometer 241. The light source 243 may be an annular illumination having an annular shape.

In the spectrometer apparatus 240, light emitted toward the compressing clamp 220 is transmitted through the polarizer 244, the second substrate 225, and liquid crystal display panel 10, and is reflected at the reflection surface of the first substrate 222. The reflected light is transmitted through the liquid crystal display panel 10, the second substrate 225, and the polarizer 245 and reaches the spectrometer 241, and the spectrum thereof is obtained in the spectrometer 241.

The compressing clamp 220 and the spectrometer apparatus 240 can be applied not only to the above-described transmissive type liquid crystal display panel 10, but also to a reflective type liquid crystal display panel.

As described above, according to the present invention, the cell thickness d can be easily determined with high accuracy without being affected by the interference of light reflected at the interfaces, the color tone of a color filter, etc.

What is claimed is:

1. A cell thickness detection method for detecting a cell thickness of a liquid crystal panel which is constructed by laminating two substrates and disposing a liquid crystal layer between the substrates, the cell thickness detection method comprising the steps of:

setting a light path for transmitting light through a first polarizing means, the liquid crystal layer, and a second polarizing means, in that order;

obtaining a spectrum of light which is transmitted along the light path;

deriving a detection value which is a wavelength, a value related to the wavelength, a frequency, or a value related to the frequency at which the spectrum has a minimum or maximum value; and determining the cell thickness based on the detection value.

2. A cell thickness detection method according to claim 1, wherein the wavelength or the frequency, at which the spectrum has the minimum or maximum value, is in the visible light region.

3. A cell thickness detection method according to claim 1, wherein a light source of light which is transmitted along the light path has an emission spectrum which is continuous in at least a wavelength region corresponding to the detection value.

4. A cell thickness control system for controlling a cell thickness of a liquid crystal panel which is constructed by laminating two substrates and disposing a liquid crystal layer between the substrates, the cell thickness control system comprising:

compressing means for applying a controlled pressure to the liquid crystal panel;

an optical detection system including a light source for transmitting light through a first polarizing means, the liquid crystal layer, and a second polarizing means, in that order;

spectrum obtaining means for obtaining a spectrum of light which is emitted from the optical detection system;

a computer for deriving a detection value which is a wavelength, a value related to the wavelength, a frequency, or a value related to the frequency at which the spectrum has a minimum or maximum value; and controlling means for controlling the pressure of the compressing means so that the detection value becomes closer to a value corresponding to a desired value of the cell thickness.

5. A cell thickness control system according to claim 4, wherein the wavelength and the frequency, at which the spectrum has the minimum or maximum value, is in the visible light region.

6. A cell thickness control system according to claim 4, wherein the light source has an emission spectrum which is continuous in at least a wavelength region corresponding to the detection value.

7. A cell thickness control system according to claim 4, wherein the controlling means controls the pressure of the compressing means based on a predetermined relationship between the pressure applied on the liquid crystal panel and the change in the detection value or of the cell thickness corresponding to the detection value.

8. A cell thickness control system according to claim 4, wherein the compressing means comprises a pair of clamping members, at least one of which is transparent, and which oppose each other with the liquid crystal panel therebetween, sealing means for sealing gaps between the clamping members and the liquid crystal panel, and fluid supplying means for supplying a fluid to the gaps between the clamping members and the liquid crystal panel with the controlled pressure.

9. A manufacturing method for a liquid crystal device including a liquid crystal panel which is constructed by laminating two substrates and disposing a liquid crystal layer between the substrates, the manufacturing method for a liquid crystal device comprising the steps of:

setting a light path for transmitting light through a first polarizing means, the liquid crystal layer, and a second polarizing means, in that order;

obtaining a spectrum of light which is transmitted along the light path;

deriving a detection value which is a wavelength, a value related to the wavelength, a frequency, or a value related to the frequency at which the spectrum has a minimum or maximum value; and compressing the liquid crystal panel in accordance with the detection value and making adjustments so that the detection value becomes almost the same as a value corresponding to a desired value of the cell thickness.

10. A manufacturing method for a liquid crystal device according to claim 9, wherein the wavelength or the frequency, at which the spectrum has the minimum or maximum value, is in the visible light region.

11. A manufacturing method for a liquid crystal device according to claim 9, wherein the liquid crystal is first injected into the liquid crystal panel, and is then sealed in such a state that the liquid crystal panel is compressed in accordance with the detection value and adjustments are made so that the detection value becomes almost the same as the value corresponding to the desired value of the cell thickness.

12. A cell thickness detection method for detecting a cell thickness of a liquid crystal panel which is constructed by disposing two substrates in such a manner that the substrates oppose each other and disposing a liquid crystal layer between the substrates, the cell thickness detection method comprising the steps of:

setting a light path for transmitting light through a first polarizing means, the liquid crystal layer, and a second polarizing means, in that order;

obtaining a spectrum of light which is transmitted along the light path;

deriving a detection value which is a wavelength or a frequency at which the spectrum has a minimum or maximum value; and determining the cell thickness based on the detection value.

13. A cell thickness detection method for detecting a cell thickness of a liquid crystal panel which is constructed by disposing two substrates in such a manner that the substrates oppose each other and disposing a liquid crystal layer between the substrates, the cell thickness detection method comprising the steps of:

setting a light path for transmitting light through a first polarizing means, the liquid crystal layer, and a second polarizing means, in that order;

obtaining a spectrum of light which is transmitted along the light path;

deriving a detection value which is a value corresponding to a wavelength or a frequency at which the spectrum has a minimum or maximum value; and determining the cell thickness based on the detection value.

* * * * *

UNITED STATES PATENT AND TRADEMARK OFFICE
CERTIFICATE OF CORRECTION

PATENT NO.    : 6,618,156 B2
DATED         : September 9, 2003
INVENTOR(S)   : Kuroiwa It is certified that error appears in the above-identified patent and that said Letters Patent is hereby corrected as shown below:

Title page,
Item [*] Notice, Term Extension should be -- 85 days --.

Signed and Sealed this

Twenty-fifth Day of October, 2005

JON W. DUDAS
*Director of the United States Patent and Trademark Office*